US012562517B2

(12) United States Patent
Schmitz et al.

(10) Patent No.: US 12,562,517 B2
(45) Date of Patent: Feb. 24, 2026

(54) PLUG-IN TERMINAL, PLUG CONNECTOR AND ROW OF PLUG CONNECTORS

(71) Applicant: Weidmüller Interface GmbH & Co. KG, Detmold (DE)

(72) Inventors: Till Schmitz, Detmold (DE); Matthias Bönsch, Bielefeld (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 401 days.

(21) Appl. No.: 18/354,033

(22) Filed: Jul. 18, 2023

(65) Prior Publication Data

US 2024/0030628 A1 Jan. 25, 2024

(30) Foreign Application Priority Data

Jul. 19, 2022 (DE) ..................... 10 2022 118 020.4

(51) Int. Cl.
*H01R 9/24* (2006.01)
*H01R 4/48* (2006.01)
*H01R 12/51* (2011.01)

(52) U.S. Cl.
CPC ....... *H01R 9/2491* (2013.01); *H01R 4/48365* (2023.08); *H01R 9/2416* (2013.01); *H01R 12/515* (2013.01)

(58) Field of Classification Search
CPC .. H01R 9/2491; H01R 9/2416; H01R 12/515; H01R 4/483; H01R 4/4833; H01R 4/4835; H01R 4/48365
See application file for complete search history.

(56) References Cited

U.S. PATENT DOCUMENTS 10,014,594 B1 * 7/2018 Wu ...................... H01R 4/4828
11,444,392 B2 * 9/2022 Tuerkekoele ........ H01R 4/4828

FOREIGN PATENT DOCUMENTS

EP 0 984 513 A2 6/1999

* cited by examiner

*Primary Examiner* — Renee S Luebke
*Assistant Examiner* — Paul D Baillargeon
(74) *Attorney, Agent, or Firm* — Laubscher & Fretwell, P.C.

(57) ABSTRACT

A plug-in terminal for the connection of one or more conductor ends has a housing made of an electrically non-conductive material. The housing includes at least one insertion opening for a respective conductor end. Each insertion opening extends to a respective housing chamber containing a connection device to which an actuation device is assigned. Each actuation device actuates a contact limb of a contact spring of the connection device. The actuation device includes a pivoted lever configured to act on a sliding element with which the contact limb of the contact spring can be moved directly or indirectly. The pivoted lever and the contact limb rotate about the same or substantially the same axis of rotation.

15 Claims, 8 Drawing Sheets

PLUG-IN TERMINAL, PLUG CONNECTOR AND ROW OF PLUG CONNECTORS

This application claims priority of DE10 2022 118020.4 filed Jul. 19, 2022. The entire content of the priority application is incorporated herein by reference.

BACKGROUND OF THE INVENTION

The invention relates to a plug-in terminal for connecting one or more conductor ends, a plug connector with one or more such plug-in terminals, and a row of such plug-in terminals and/or plug connectors.

BRIEF DESCRIPTION OF THE PRIOR ART

A wide variety of such rows of plug-in terminals, in particular as part of plug connectors, are known from the prior art.

As described herein, a plug-in terminal has a housing with one or more connection devices for a plugging connection and for electrically conductively connecting an end of a conductor (or of a plug or the like) to a busbar. An actuation device is assigned to the respective connection device.

The respective busbar can in turn be connected to a plug-in terminal. The plug-in terminal then also forms a plug connector for connection to a mating plug connector. However, the respective busbar can be connected to another device, such as with a solder connection which serves to connect the plug-in terminal to a printed circuit board. The plug-in terminal then forms a printed circuit board connector. Further configurations are also possible.

A row of plug-in terminals or, where applicable, of plug connectors includes in particular a higher-level multipanel plug-in terminal in a configuration as a multipanel plug-in terminal and where applicable, a multipanel plug connector, which can be plugged together with a corresponding mating plug connector. The multipanel plug-in terminal and where applicable, multipanel plug connector have a number of plug connectors and where applicable, plug-in terminal panels which are joined together and mechanically connected to one another directly with mechanical connecting devices into a rail shape. However, the row of plug-in terminals can also be laid out differently, for example for further connection to a printed circuit board.

According to EP 0 984 513 A2, a plug-in terminal which is formed as a plug connector has an insulating panel-like plastic housing with at least two connection devices for incoming electrical cables and at least two pin or socket contacts, which are each connected to the connection devices and which are able to be connected to the mating plug connector.

The plug-in terminal according to EP 0 984 513 A2 is intended to be further optimised with regard to a narrow design of the individual plug-in terminals. The present invention solves this problem.

SUMMARY OF THE INVENTION

A plug-in terminal for the connection of one or more conductor ends has a housing which is made of an electrically non-conductive material such as plastic. The housing has at least one insertion opening for a respective conductor end, the respective insertion opening being in connection with a respective housing chamber and the housing chamber having a respective connection device, to which a respective actuation device is assigned. The actuation device is provided to actuate a contact limb of a contact spring of the connection device. The actuation device has a pivoted lever designed to act on a sliding element with which the contact limb of the contact spring can be moved directly or indirectly, wherein the pivoted lever and the contact limb can rotate about the same or substantially the same axis of rotation.

This design results in a very small installation space requirement for the connection device with the actuation device. It is known in principle that the axis of rotation of a pivoted lever of an actuation device and the axis of rotation of the clamping limb of the contact spring align. However, it has not been recognized that this measure has a particularly advantageous effect in the case of an actuation device as a combination of a pivoted lever and a sliding element, wherein the pivoted lever preferably acts on the sliding element. In such a combination, according to the prior art, the pivoted lever as a general rule has been arranged further away from the contact spring, such that the axes of rotation of these elements do not align, which leads to a less compact structure.

In structural terms. the invention is able to be implemented if the contact spring is formed substantially in a V-shape and if the respective pivoted lever is pivotably borne on a pin of the housing, which is the same pin as or is formed concentrically relative to a pin of the housing. The pin is overlapped by the approximately V-shaped contact spring.

However, other types of bearings are conceivable.

Optionally, the sliding element can be locked in a sliding position in which the contact limb is held in an open position for introducing a conductor or the contact limb itself can be locked in the open position for the introduction of a conductor and a device for releasing this locking is provided. In this way, it is possible to achieve locking in the open position of a connection device with a combined pivoted lever and sliding element. Furthermore, the device for releasing the locking of the sliding element and/or the contact spring is actuated upon introduction of a conductor.

To further provide a compact design, the sliding element is displaceably guided in the housing to actuate the contact leg and additionally is somewhat tiltable and/or pivotable to lock and to release the conductor.

In this manner, various designs can be realized and thus the pivoted lever and the respective associated contact spring are arranged beside one another in the housing in planes which are parallel to one another. However, it is also conceivable that the pivoted lever and the contact spring are arranged in the housing entirely or substantially in a common plane.

In addition, according to another embodiment, the respective insertion opening is arranged on the upper side of the housing.

According to a preferred configuration, the respective connection device is designed in each case as a spring-loaded direct plug contact. This results in a particularly simple toolless contacting of the conductor ends. Once again, this contacting is further simplified if the contact spring is lockable in an open state out of which it can be released by inserting the conductor end into the housing.

The invention also creates a plug connector with one or more plug-in terminals, wherein a first busbar section is lengthened and, jointly with a respective second busbar section configures a plug contact ato which the plug connector can be contacted with a mating plug connector. As a result, through a functional integration, a compactly constructed contact is created for connection to the mating plug connector.

However, the plug-in terminal or the number of joined-together plug-in terminals can also be provided with a solder connection for contacting a printed circuit board which is connected to the respective connection device in an electrically conductive manner.

The respective housing of the plug connector (panels) has at least two insertion openings for conductor ends, the first insertion opening being in connection with a first housing chamber and the second insertion opening being in connection with a second housing chamber and the first housing chamber having a first connection device and the second housing chamber having a second connection device, wherein the housing has a first housing half and a second housing half. The first housing half is able to be reproduced on the second housing half, such that the housing is formed substantially or entirely in a rotationally symmetrical manner with regard to a point of symmetry S or an axis of symmetry on which the point of symmetry S is situated.

In this way, there is provided a respective plug connector with optimized clearances and creepage distances, during the manufacturing of which it is also possible to employ many identical parts. This is because the housing chambers and the connection devices arranged therein are arranged far distant from one another on opposite sides of the housing in the two housing halves which are turned to one another, which ensures large, or optimized, clearances and creepage distances. In addition, the connection devices can be produced on both sides from identical parts and do not have to be formed mirror-symmetrically in two versions for the left and right housing halves (which are open toward the same side—according to the prior art). Furthermore, the joining-on of other plug connectors, starting from a first plug connector, is made possible in a particularly simple manner in two different joining-on directions, as a result of which the plug connector is advantageously flexible in use. It is particularly advantageous if the two housing halves are oriented to one another, turned by 180°, and are preferably integrally connected to one another.

BRIEF DESCRIPTION OF THE FIGURES

The invention is described in greater detail hereafter with reference to the accompanying drawing by means of different embodiments, wherein further variations and configurations are also discussed. In the drawing.

DETAILED DESCRIPTION

The terms used hereafter such as "vertical", "perpendicular", "horizontal", "top", "bottom", "right", "left" relate to the respective drawing figure. A spatial coordinate system in each drawing can be used for additional orientation.

FIGS. 1*a*-1*g* show a substantially panel-like single-panel plug connector 1 which can be plugged together with a mating plug connector, with the mating plug connector (not shown) also being able to be formed as a section of a series terminal or as a section of an electrical appliance, for example.

The mating plug connector may be joined onto a mounting rail or a circuit board or the like. The respective plug connector 1 can be joined together with further single-panel plug connectors 1 of an identical or substantially identical design, so that there then arises a higher-level multipanel plug connector 100 made up of a number of single-panel plug connectors 1 joined together. Hereafter, the respective single-panel plug connector 1 or respective plug connector panel is also referred to as a "plug connector", for short.

The multipanel plug connector 1 from FIGS. 1*a* to 1*f* preferably has at least one or more plug connector panels or plug connectors. These each have a substantially or precisely rotationally symmetrical housing 2 which is preferably made of an electrically non-conductive material, such as plastic. The respective plug connector 1 in turn has a plug-in terminal for connection of a conductor end to the plug-in terminal.

Here, the term "rotationally symmetrical" means that the housing 2 is mirrored at only one single point of symmetry, and in doing so reproduces itself.

Figure 1A:
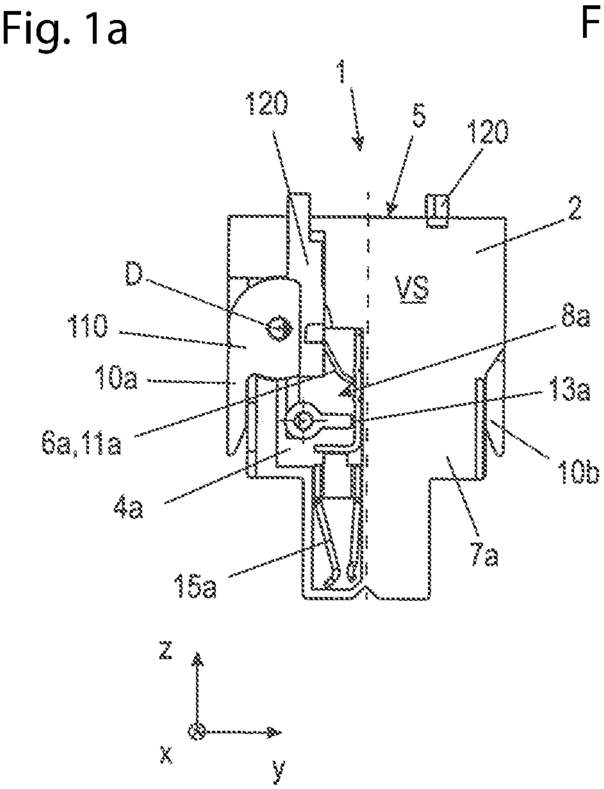
FIG. 1*a* is a front view of a first embodiment of a plug connector according to the invention with plug-in terminals.
Figure 1B:
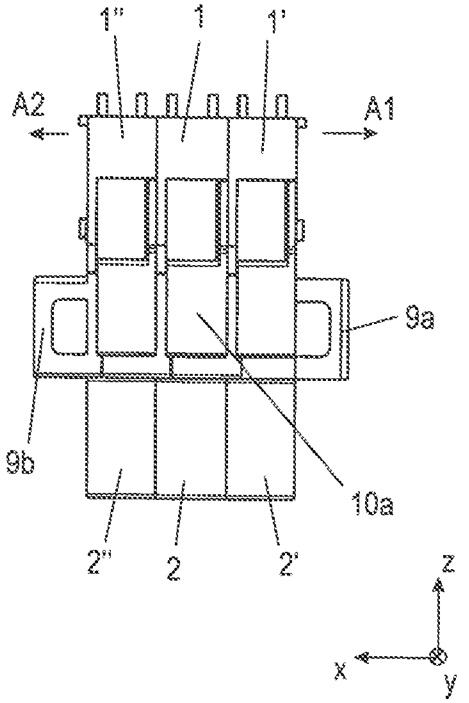
FIG. 1*b* is a side view of a number of joined-together plug connectors from FIG. 1*a;*
Figure 1C:
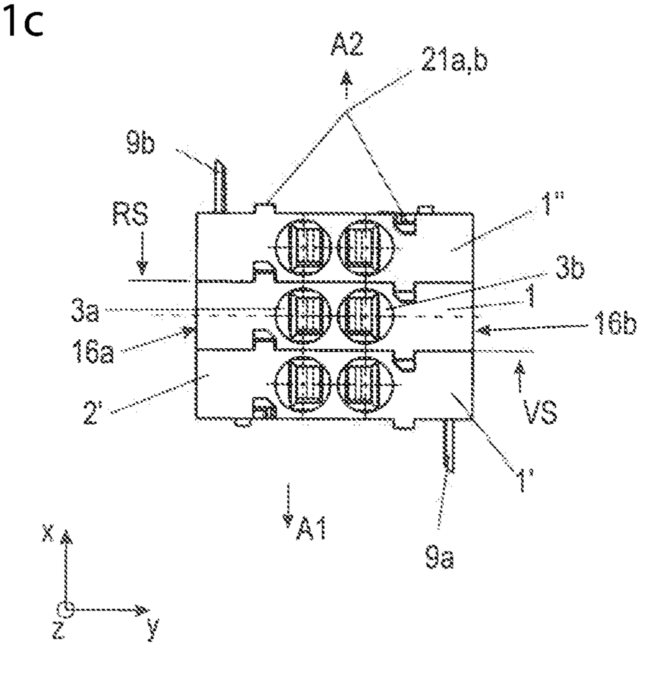
FIG. 1*c* is a top view of a number of joined-together plug connectors from FIG. 1*a;*
Figure 1D:
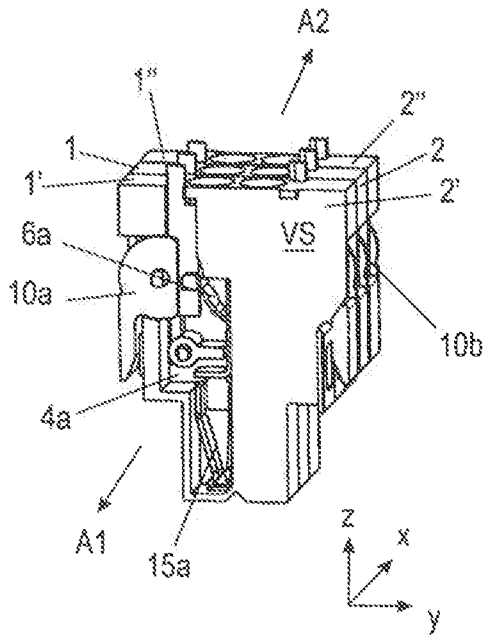
FIG. 1*d* is a perspective view of a plurality of joined-together plug connectors from FIG. 1*a* with an actuation device for a connection device for conductors in a home position.
Figure 1E:
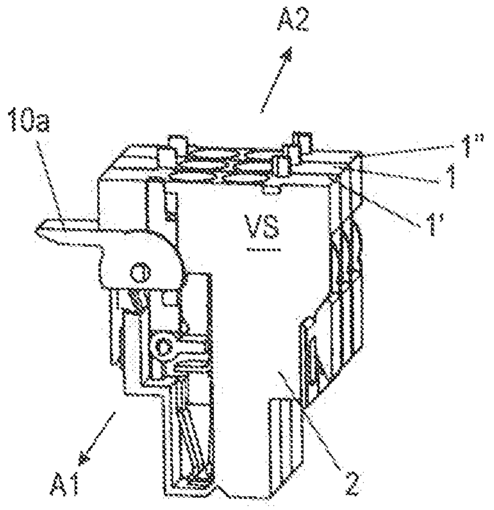
FIG. 1*e* is a perspective view of a plurality of joined-together plug connectors from FIG. 1*a* with an actuation device for the connection device for conductors in a pre-stressed position.
Figure 1F:
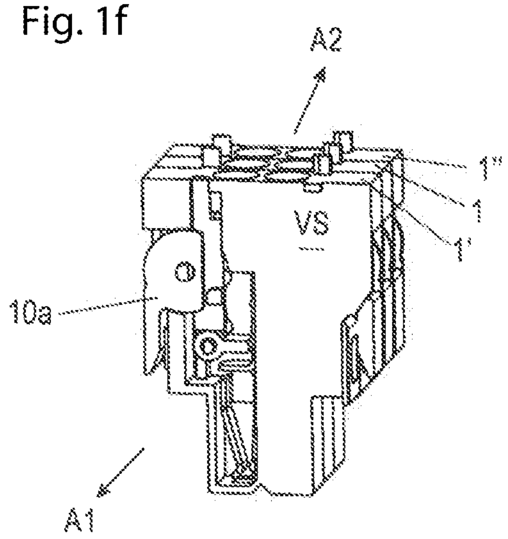
FIGS. 1*f* and 1*g* are perspectiver views, respectively, of a plurality of joined-together plug connectors from FIG. 1*a* with an actuation device for the connection device for conductors in a position in which the connection device could contact a conductor with a spring in a tensioned state.
Figure 1G:
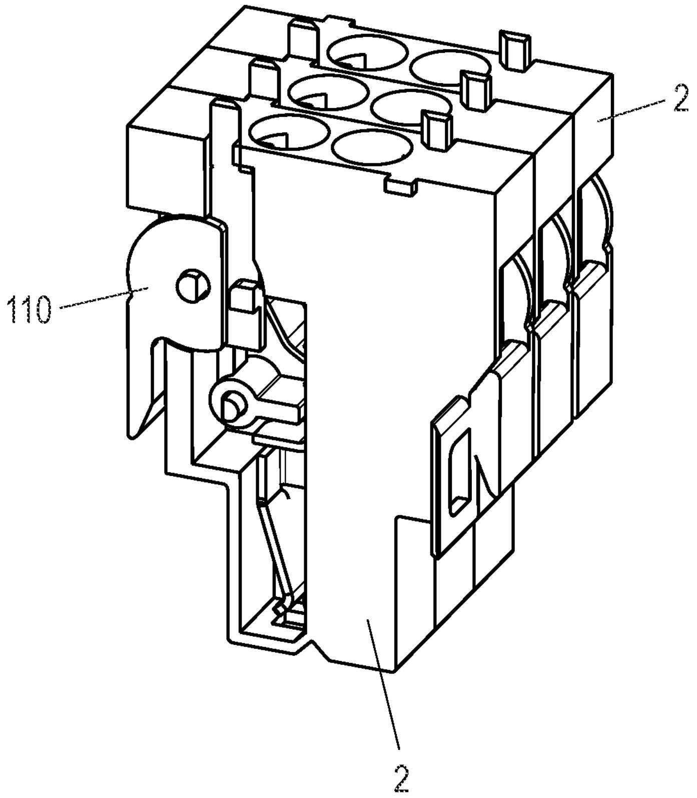
Figure 2D:
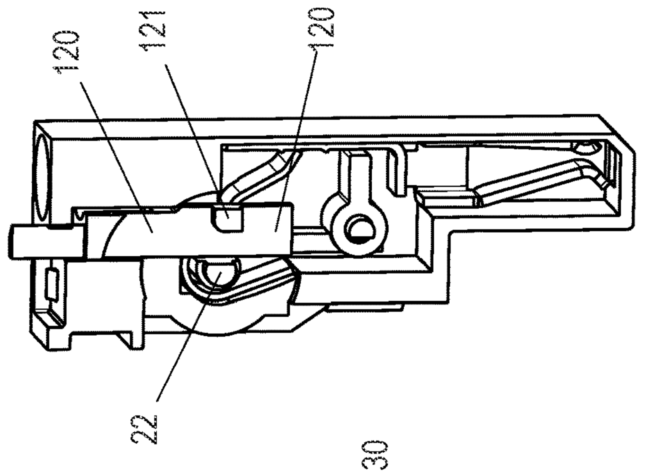
FIGS. 2*c* and 2*d* are side views of the plug connector of FIGS. 2*a* and 2*b*, respectively, where the pivoted lever is removed.
Figure 2C:
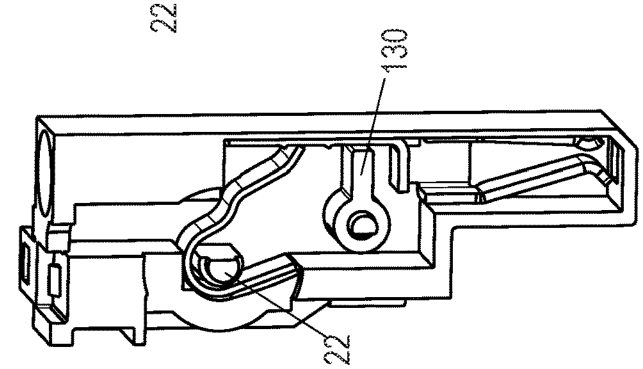
Figure 2B:
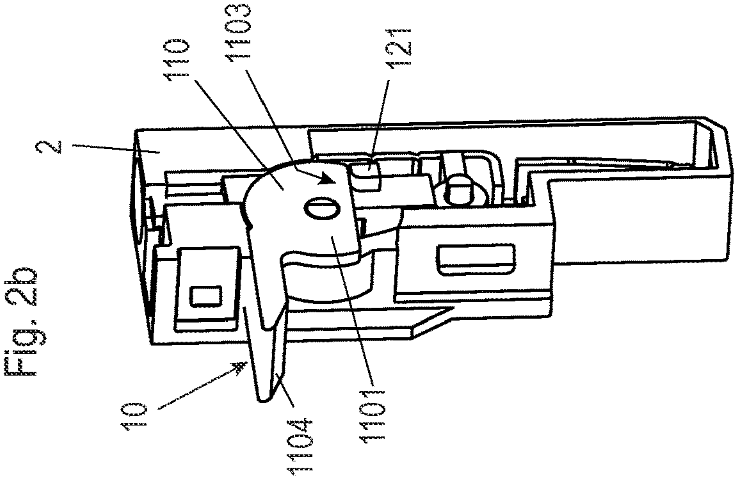
FIGS. 2*a* and 2*b* are perspective views and a second embodiment of a joinable plug connector formed as a plug connector panel in first and second actuation positions, respectively, of an actuation device having a pivoted lever.
Figure 2A:
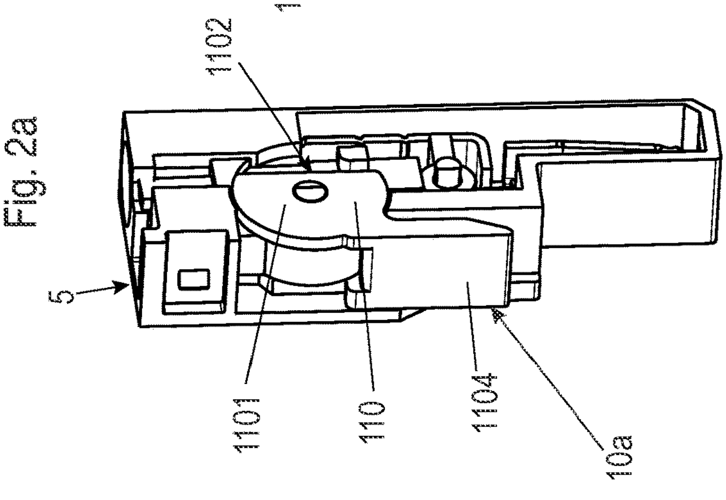
Figure 2E:
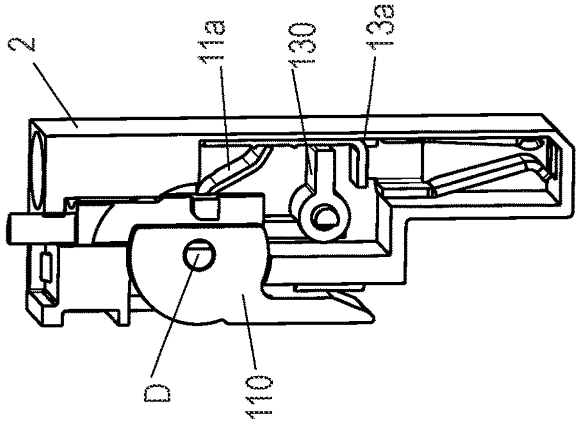
FIGS. 2*e* and 2*f* are side views of the plug connector of FIGS. 2*a* and 2*b*, respectively.
Figure 2F:
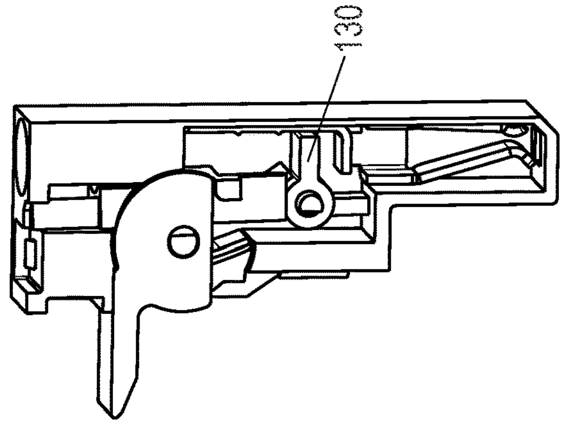
Figure 2G:
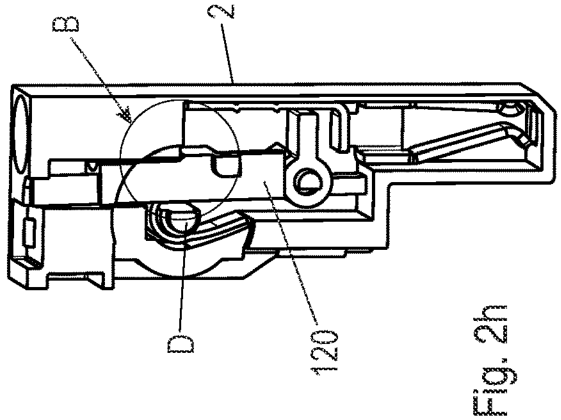
FIG. 2*g* is a side view of the plug connector of FIG. 2*f* showing a sliding element in a first position.
Figure 2H:
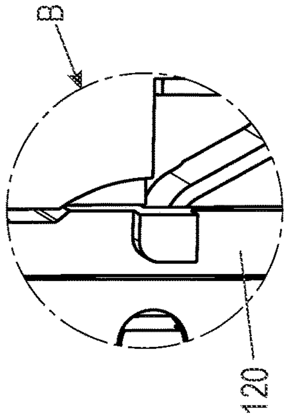
FIG. 2*h* is a detailed view of a portion B of the plug connector of FIG. 2*g;*
Figure 2I:
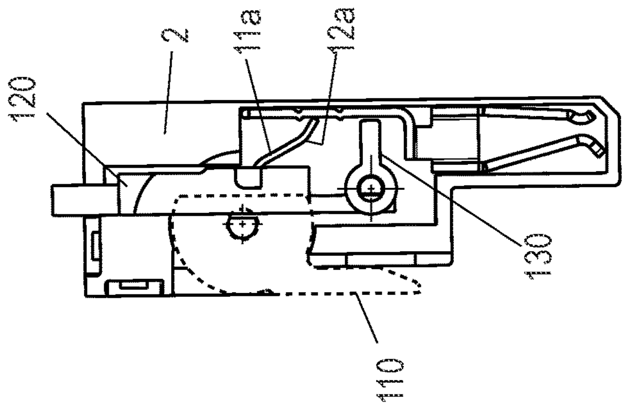
FIG. 2*i* is a side view of the plug connector of FIG. 23 showing a sliding element in a second position.
Figure 3B:
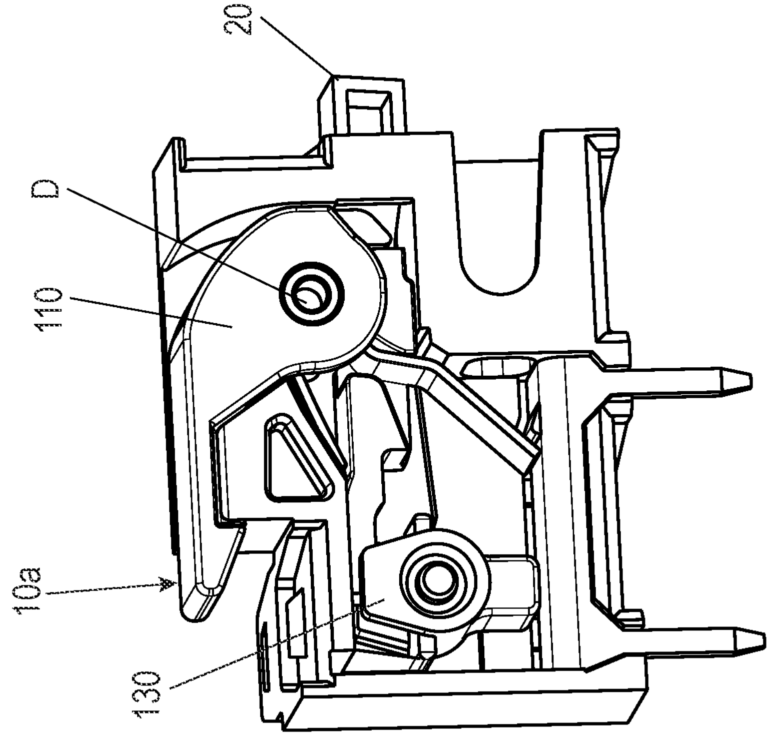
FIGS. 3*a*-3*d* are perspective views, respectively, of a further embodiment of a plug-in termal for connection of the end of a conductor in a joinable connection panel in different actuation states.
Figure 3A:
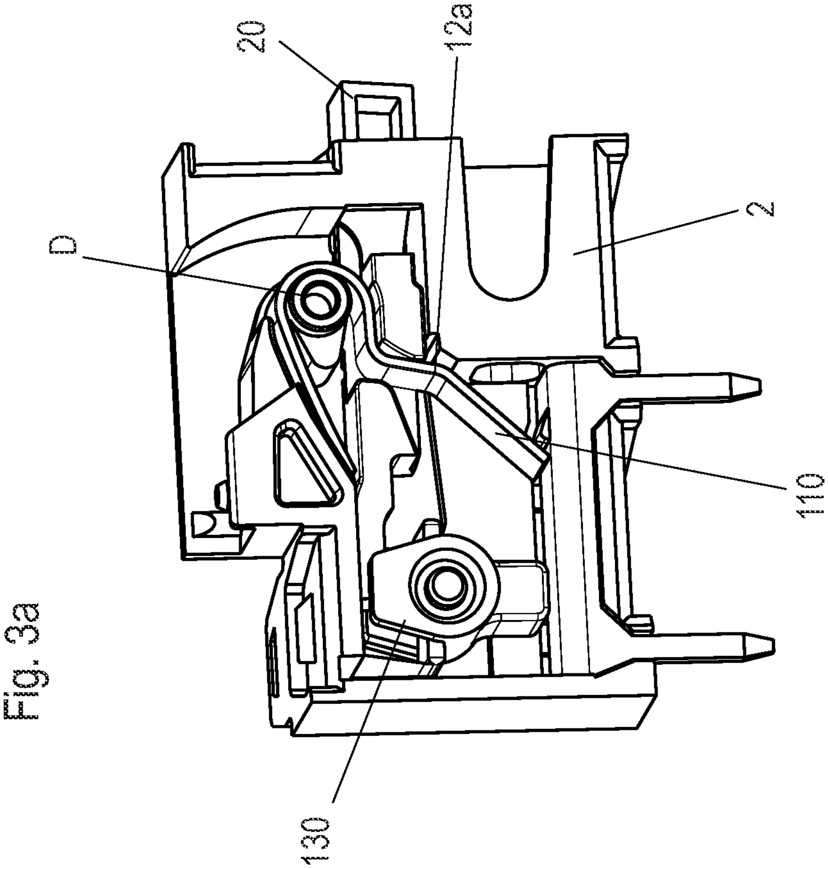
Figure 3D:
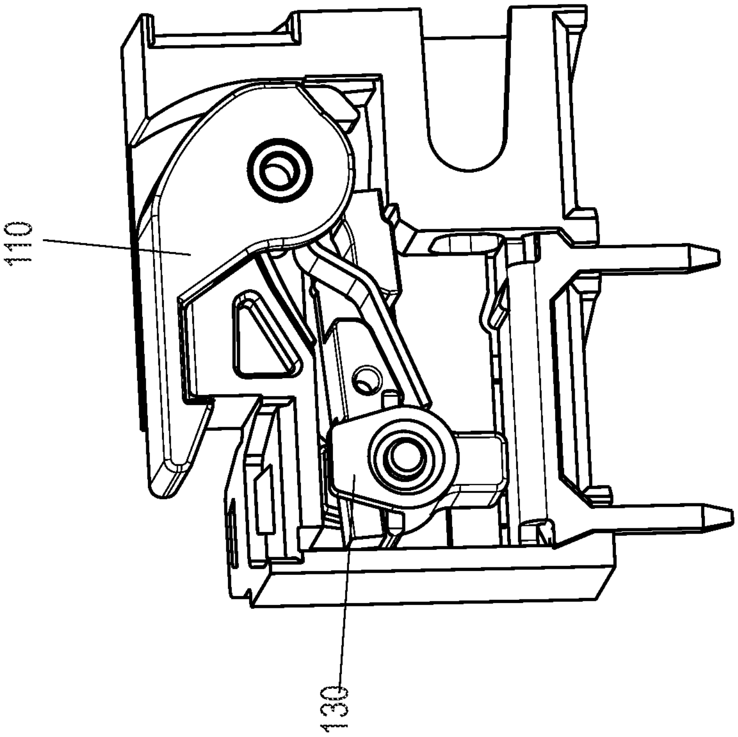
Figure 3C:
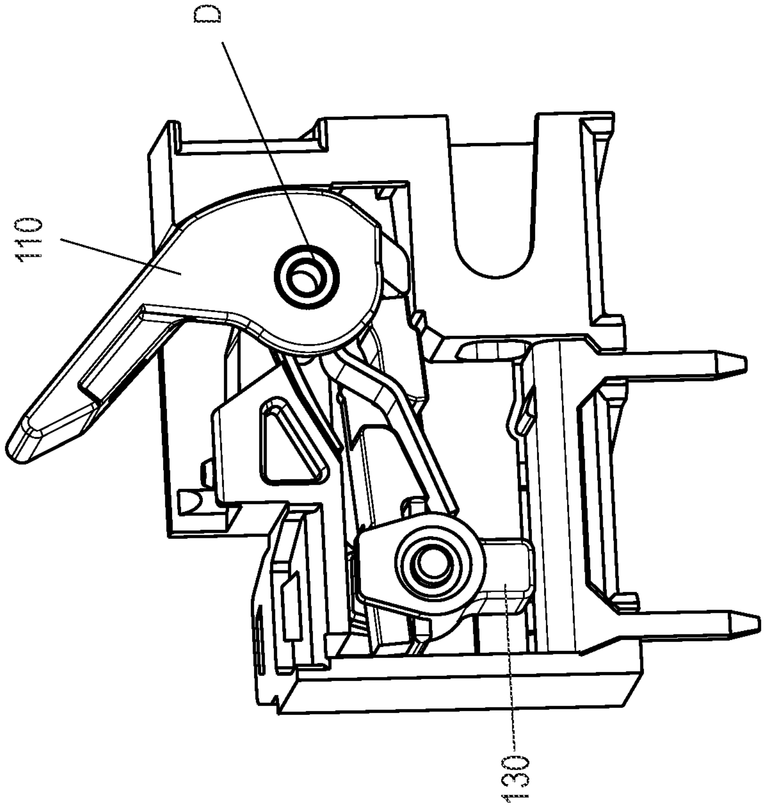
Figure 3E:
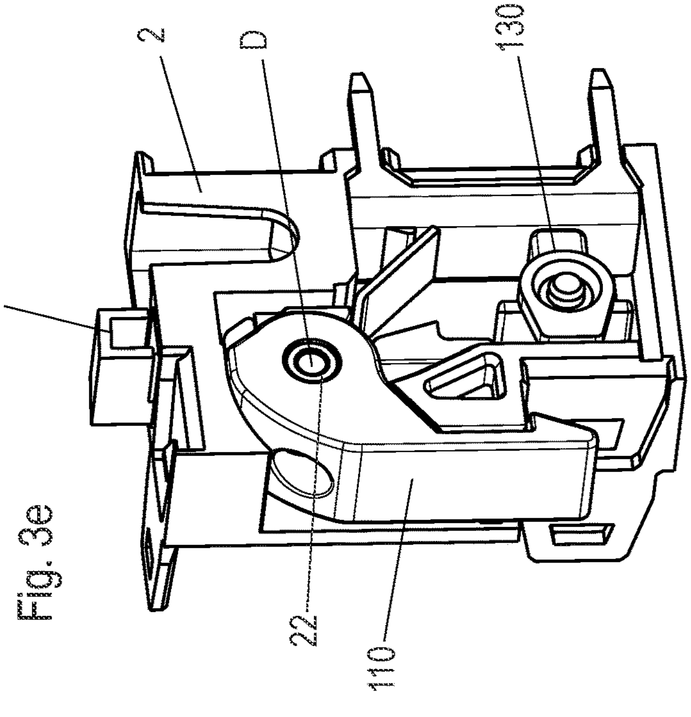
FIG. 3*e* is a perspective view of the plug-in terminal of FIG. 3*d* rotated by 90°.
Figure 3F:
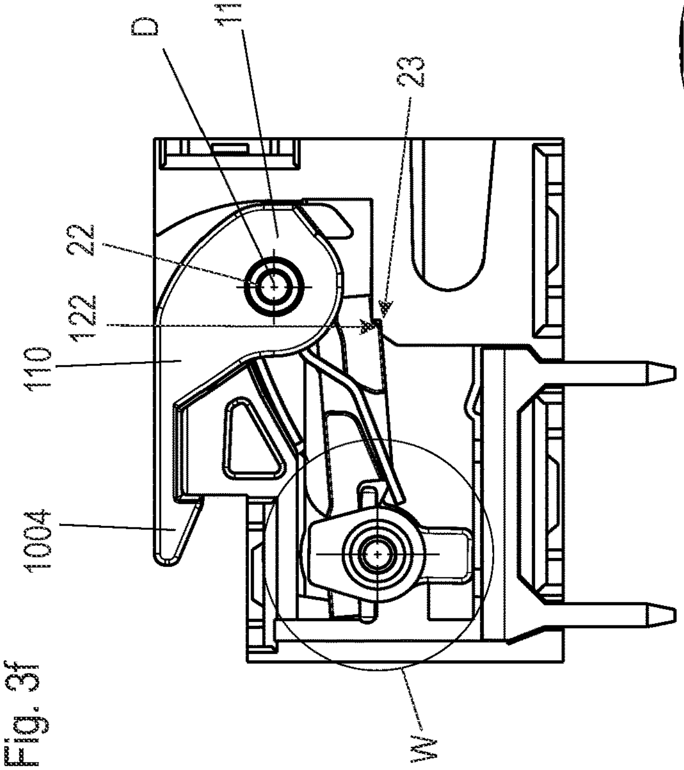
FIG. 3*f* is a side view of the plug-in terminal of FIG. 3*d*.

In FIGS. 1*c*, 2*c* and 3*c*, the point of symmetry is situated on an imaginary point of intersection of two center lines which respectively bisect the length and the width with regard to a housing upper side 5—with regard to the coordinate system in FIGS. 1*a*, 1*b*, 1*c* parallel to an x-y plane—of the housing 2. This applies to any plane parallel to the x-y plane with regard to the entire housing 2, such that there arises parallel to the z-axis an imaginary axis of symmetry through the points of symmetry on these planes.

In other words, if a first housing half 8*a*, in the point of symmetry or axis of symmetry is rotated by 180° in the clockwise direction, this first housing half 8*a* is reproduced on a second housing half. In this regard, the housing 2, like the first housing half 8*a* and the second housing half, can also be referred to as inversion-symmetrical or rotationally symmetrical with regard to the point of symmetry. In the drawing, only the first housing half 8*a* is shown.

The housing 1 from FIGS. 1 to 3 has at least one or more—here, precisely two—insertion openings 3*a*, 3*b* for respective conductor ends. The first insertion opening 3*a* and the second insertion opening 3*b* are arranged on the upper side 5 of the housing 2. They could also be arranged at an angle or laterally. The respective insertion openings 3*a*, 3*b* widen into a first housing chamber 4*a* and a second housing chamber, respectively.

The first housing chamber 4*a* substantially occupies the first housing half 8*a* and the second housing chamber substantially occupies the second housing half.

The first housing chamber 4*a* has a first connection device 6*a* and the second housing chamber has a second connection device. The connection devices are arranged in the respective housing chambers in a mirror-symmetrical or also rotationally symmetrical manner relative to one another.

In terms of this description of the figures and of the entire document, the housing 2 with one or more of the connection devices 6*a* for plugging connection of a respective conductor end for the electrically conductive connection of the conductor end (or of a plug or the like) to a busbar 13, with an actuation device 10*a* respectively being assigned to the respective connection device, first forms a plug-in terminal. The respective busbar 13 can in turn be connected to a plug contact. The plug-in terminal then also forms a plug connector. A plug connector may have a number of plug-in terminals, wherein, in a housing 2, a number of connection devices for conductor ends are provided with respective actuation devices 10*a* which are each formed with a plug-in contact for connecting a mating plug contact of a mating plug connector.

The housing 2 of the plug-in terminal—here, of the plug connector 1—has, on its front side VS—as depicted in FIG. 1*a*—a first housing wall 7*a* which closes only the second housing chamber (not shown) which would be arranged on the right in FIG. 1*a*. In contrast, the first housing chamber 4*a*, which in FIG. 1*a* is arranged on the left on the front side VS of the housing 2, is open such that the first connection device 6*a* is visible here. The first housing chamber 4*a* is thus outwardly open on the front side VS of the housing 2.

The housing chambers and the connection devices arranged therein and the two metal structural components are thus arranged far distant from one another on opposite sides of the housing in the two housing halves which are turned relative to one another, which ensures large, or optimized, clearances and creepage distances.

The housing 2 of the plug-in terminal has, on its rear side RS shown in FIG. 1*c*, a second housing wall which likewise closes only one of the two housing chambers, namely the first housing chamber 4*a*. The first housing chamber 4*a*, arranged to the right in the direction of view onto the rear side RS of the housing 2, is arranged in one housing half. In contrast, the second housing chamber would be arranged to the left in the direction of view onto the rear side RS. The second housing chamber is thus outwardly open on the rear side RS of the housing 2 and is arranged in the other housing half.

The first housing chamber 4*a*, on the front side VS of the housing 2, i.e. to the left in FIG. 1*a*, is closed in that a second, geometrically identical plug connector 1 is joined with its housing 2 on the front side VS of the plug connector 1, which is already joined, in a first joining-on direction A1—i.e. in a negative x-direction with regard to the coordinate system in FIG. 1*a*, onto the housing 2 of the first plug connector 1 shown in FIG. 1*a*.

Similarly, the second housing chamber is closed on the rear side RS of the housing 2, in that a third, geometrically identical plug connector 1 shown in FIG. 1*b* and FIG. 1*c* is joined with its housing 2 on the rear side RS of the plug connector 1, which is already joined on, in a second joining-on direction A2—i.e. in a positive x-direction with regard to the coordinate system in FIG. 1*a*, onto the housing 2 of the first plug connector 1 depicted in FIG. 1*a*.

Through the housing 2, which is open over half the side, both on the front side VS and on the rear side RS of the housing 2, the plug connector 1 according to FIG. 1*a* to FIG. 1*f*. can advantageously be joined together in two different joining-on directions A1, A2.

The first joining-on direction A1 extends in the negative x-direction with regard to the coordinate system in FIG. 1*a*. The second joining-on direction A2 extends in the positive x-direction with regard to the coordinate system in FIG. 1*a*. There arises a flexible, simple assembly and a high degree of use of identical parts since the geometrically identical housing 2 is always able to be used, irrespective of the joining-on direction A1, A2 in which the next plug connector is intended to be joined on.

In order for the plug connectors 1, 1', 1" to be joined on in the correct orientation, the housing 2 has in each case form-fitting elements 21*a, b* which also serve as joining aids. The form-fitting elements 21*a, b* are formed such that form-fitting elements of adjacent housings or plug connectors, in a row of the plug connectors 1, 1', 1"—respectively are a pin and a recess which substantially engage one another in a substantially form-fitting manner. If the plug connectors 1, 1', 1" are joined together incorrectly, the plug connectors 1, 1', 1" therefore cannot be incorrectly constructed without a gap between the housings 2, 2', 2". In this manner, the form-fitting elements 21*a, b* prevent the plug connectors 1, 1', 1" from being joined together in the wrong way round and make the row secure.

In order to connect the joined-together plug connectors 1, 1', 1", or their housings 2, 2', 2", to one another, the respective housing 2, 2', 2" furthermore has a first locking device 9*a* and a second locking device 9*b*.

The first locking device 9*a* is arranged to the right on the front side VS of the housing 2 in FIG. 1*a* and is likewise arranged to the right on the rear side RS in the direction of view onto the rear side RS of the housing 2. The second locking device 9*b* or mating locking device (not shown) is thus located to the left on the front side VS of the housing 2 and likewise to the left on the rear side RS in the direction of view onto the rear side RS of the housing 2 as also shown in FIG. 1*b* and FIG. 1*c*. The first locking device 9*a* can, for example, be designed as a locking hook and the mating locking device can be designed as a latch.

The multipanel plug connector 1 from FIGS. 1*a* to 1*f* can have a substantially or precisely rotationally symmetrical housing 2. This is advantageous, but not mandatory. FIGS. 2*a*-2*h* and 3*a*-3*g* show other embodiments of plug connectors or plug connector panels in which this is not the case.

The one or two connection devices 6*a* per panel—also referred to as a metal structural component—are designed in each case as pressure-spring connections and preferably as direct plug-in terminals. The design of the connection devices 6*a* in each case as a pressure-spring connection and in direct-plugging technology is advantageous because it makes it possible to accomplish contacting without a tool, which is in this case also able to be released without a tool. Alternatively it is possible to also provide other connection types with contact springs, such as connections in tension spring technology. Furthermore, a number of conductor connections per housing 2 can also be envisaged in each case.

The respective connection device 6*a* in each case has a respective actuation device 10*a*, 10*b*, which is provided to tension a contact-and-clamping limb 11*a* of a contact-and-clamping spring 12*a* (called "contact limb" and "contact spring" for short) of the connection device 6*a* to open a contact-and-clamping site and to lock it preferably also in an open position.

Here, the respective actuation device 10*a*, 10*b* has in each case a pivoted lever 110 which is pivotably mounted in the housing 2. The pivoted lever 110 acts, via a sliding element 120, on the respective contact spring 12*a* in order to open it. The contact spring 12*a* can be prestressed in the open position (see FIGS. 2*g* and 2*h*—without the contact spring—and FIG. 3*g*), such that it is releasable by a conductor which is introduced into the housing 2. The conductor releases the prestressing and is then pressed, in a clamping manner, against the busbar section 13*a* by the contact limb, and is thus contacted. For this purpose, a conductor can contact a triggering element 130 which in this embodiment is configured as a rocker and on which it hits upon insertion into the housing 2.

A contact is thus produced when the respective stripped conductor ends are inserted into the respective insertion opening 3*a*, 3*b*. In this case, the prestressing of the contact spring 12*a* is released again through action on the rocker 130, as a result of which the contact limb 11*a* then can press the respective conductor end against the first busbar section 13*a*.

The contact can in each case be released again by the actuation device, which has the pivoted lever 110 and sliding element 120, through which pressure can be exerted onto the contact limb 11*a* of the contact spring 12*a* in order to once again be able to open and/or optionally prestress the contact spring 12*a* to contact the conductor end (not shown). For this purpose, locking is obtained, with which one or more elements of the connection device 6*a* and/or the actuation device 10*a,b* allocated to it can be locked again in an open position, in which the introduction of the conductor is again possible, in order to initiate a new wiring by actuating the rocker 130.

It is thus preferred that the sliding element 120 is able to be locked in the housing 2 and in this way holds the contact limb 12*a* in an open position. The locking of the contact limbs 12*a* is possible as an example, but it is not a mandatory option. The connection device—here a direct plug-in terminal—could also be formed as a direct plug-in terminal which is not lockable in an open position and in the case of which the contact limb 12*a* would have to be pivoted with the actuation device before the conductor is inserted in order to move the contact limb into an open position in which the conductor can be inserted into the clamping site. Then the actuation device is released or let free, so that the contact limb 11*a* presses the conductor against the busbar section 13*a*.

Figure 3G:
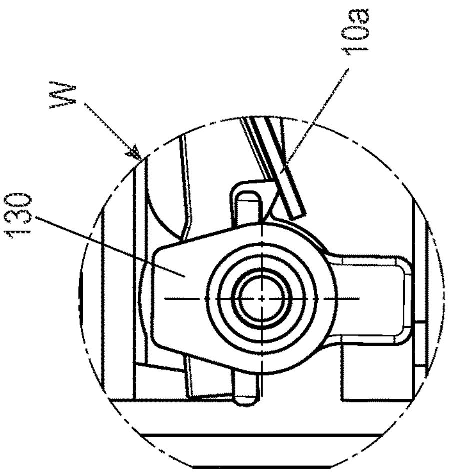
FIG. 3*g* is a detailed view of a portion W of the plug-in terminal of FIG. 3*f.*

According to FIGS. 1 to 3, the sliding element 120 is also easily tiltable and/or pivotable in the housing 2 to lock with a locking edge 122 on a housing locking edge 23 of the housing 2, for example, (see FIG. 3*g*).

It is particularly advantageous that the pivoted lever 110 and the contact spring 6*a*, 11*a* have an identical axis of rotation D. This means that the axes of rotation D of the pivoted lever 110 and the axis of rotation D about which the clamping limb 11*a*, 11*b* is pivoted are fully or at least partially aligned or are formed in a fully or at least partially concentric manner.

This design results in a very small installation space requirement. It is known in principle that the axis of rotation D of a pivoted lever 110 of an actuation device and the axis of rotation D of the clamping limb of the contact spring align. However, it has not been recognized that this measure has a particularly advantageous effect even in the case of an actuation device as a combination of a pivoted lever 110 which acts on a sliding element 120 for opening the contact limb 11*aa*, 11*b*. In such a combination, according to the prior art, the pivoted lever 110 as a general rule is arranged further away from the contact spring 12*a* such that the axes of rotation D of these two elements do not align, which, however, leads to a less compact structure.

According to FIGS. 1 to 3, the actuation device 10*a*, 10*b* has in each case a pivoted lever 110, which is pivotably mounted. The respective pivoted lever 110 can have a panel section 1101, (FIG. 2*b*) at which it is rotatably mounted in the housing 2 whose sliding element 120 it is meant to actuate. On the respective panel section 1101 there can be formed a pivoted lever arm 1102 for actuation by a user, which can project from the panel section 1101—e.g. in a substantially radial manner. On the panel section 1102 there can be formed an actuation section 1103—formed here by an edge of the panel section, which serves to act on the sliding element 120, in order to convert the rotational movement of the pivoted lever 110 into a substantially linear movement of the sliding element 120. In addition, an arm 1104 can be provided to manually rotate the pivoted lever 110. The sliding element 120 can have a protrusion 121 or the like on which the pivoted lever 110 can act with its actuation section 1103.

The sliding element 120 is configured to be long, such that it reaches into the region of the rocker 130. The sliding element 120 and the rocker 130 are matched to one another so that, when the conductor is introduced, it actuates the rocker 130 which can pivot the sliding element 120 a little in its sliding channel, such that the sliding element 120 can be released out of a locking position in the housing 1 or out of a locking position at any other element (see in this regard FIG. 2*h*, for example).

The pivoted lever 110 can be penetrated in the region of the axis of rotation D by a pin 22, e.g. of the housing 2, which can also act as a journal of the pivoted lever 110. The contact spring 10 can also bear on this pin 22 of the housing. It is preferably formed as a V-shape and bears with an arch which virtually forms the point of the V-shape, on the pin 22 of the housing 2. If the pivoted lever 110 then encompasses the contact spring 12*a* in a U-shaped manner, two bearing sites can be realized for the pivoted lever 110, which are situated axially to the region in which the contact spring 12 overlaps the pin 22.

According to FIGS. 1*a* to 1*h*, the pivoted lever 2 is arranged to the side of the contact spring 12*a*. These two elements are then arranged in the housing 2 entirely or substantially in two parallel planes which are adjacent to one another. FIGS. 2*a*-2*h* show such a configuration. It has the advantage that the connection device with the actuation device can be formed very compactly and its individual elements, such as the pivoted lever 110, can be formed simply and inexpensively.

However, it can also be envisaged that the pivoted lever 110 and the contact springs 12*a* are situated entirely or substantially in a common plane. FIGS. 3*a*-3*g* show such a configuration. This configuration is particularly stable and secure because slanting of the pivoted lever 120 is avoided.

The first busbar section 13*a* is lengthened downwards in the vertical direction—i.e. in the negative z-direction with regard to the coordinate system in FIG. 1*a*—and forms, together with a respective second busbar section 15*a* in each case a plug contact, in this case a tulip contact or socket contact, by which the plug connector 1 formed as a plug-in terminal can be plugged onto the mating plug connector. The plug contact can also be a contact blade or a pin contact. However, a solder contact or the like can be formed at this location (see FIGS. 3*a*-3*g*). The plug-in or solder contact or the like can be arranged in a vertical extension of the busbar 13*a*, or rather in the plug-in direction—Z of the conductor end. However, it can also be arranged at an angle to it.

What is claimed is:

1. A plug-in terminal for a connection of at least one conductor end, comprising a housing made of an electrically non-conductive material and containing at least one insertion opening for a respective conductor end, each insertion opening being connected with a respective housing chamber, each housing chamber having a respective connection device and a respective actuation device, wherein said actuation device actuates a contact limb of a contact spring of said connection device, and wherein said actuation device includes a pivoted lever configured to act on a sliding element with which said contact limb of said contact spring can be moved, said pivoted lever and said contact limb rotating about a same axis of rotation.

2. The plug-in terminal according to claim 1, wherein said contact spring is formed in a V-shape and said pivoted lever is pivotably borne on a pin of said housing, said pin being overlapped by said contact spring.

3. The plug-in terminal according to claim 1, wherein said sliding element is locked in a sliding position in which said contact limb is held in an open position for introducing a conductor or said contact limb is locked in the open position for the introduction of a conductor, and further comprising a release device for releasing the locked sliding or open position.

4. The plug-in terminal according to claim 3, wherein said release device is actuated upon introduction of a conductor.

5. The plug-in terminal according to claim 1, wherein said sliding element is displaceably guided in said housing and is pivotable to lock and to release the contact limb.

6. The plug-in terminal according to claim 1, wherein said pivoted lever and said respective contact spring are arranged beside one another in said housing in parallel planes.

7. The plug-in terminal according to claim 1, wherein said pivoted lever and said contact spring are arranged in a common plane.

8. The plug-in terminal according to claim 7, wherein said pivoted lever encompasses said contact spring in a U-shaped manner.

9. The plug-in terminal according to claim 1, wherein each insertion opening is arranged on an upper side of said housing.

10. The plug-in terminal according to claim 1, wherein each connection device comprises a spring-loaded direct plug contact.

11. The plug-in terminal according to claim 10, wherein said spring-loaded direct plug contact can be locked with said contact spring in an open position.

12. The plug-in terminal according to claim 1, wherein said pivoted lever has a lever arm which, at least in one position, extends from said housing.

13. A plug connector comprising at least one plug-in terminal according to claim 1 and a plug-in contact for contacting a mating plug connector.

14. A row of plug connectors comprising a plurality of plug connectors according to claim 13.

15. A row of plug-in terminal comprising a plurality of plug-in terminals according to claim 1.

* * * * *